Sept. 30, 1958    J. B. KEIR    2,854,162
LOW BED TRAILER WITH REMOVABLE GOOSENECK
Filed Dec. 7, 1956    3 Sheets-Sheet 1
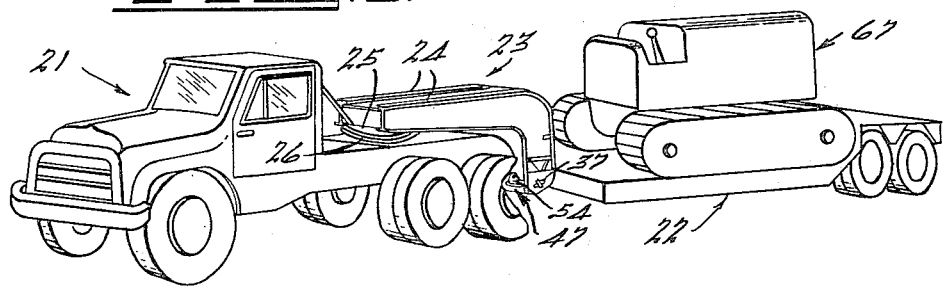
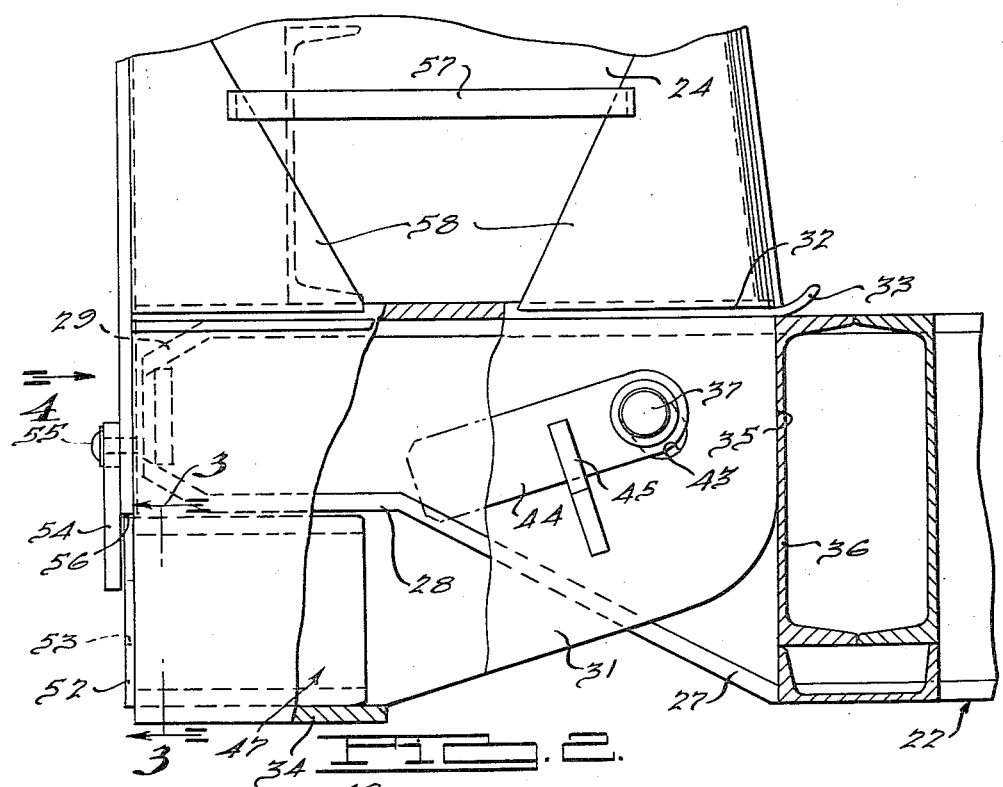
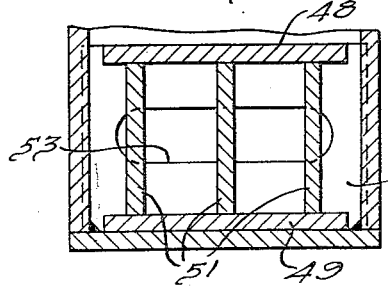
INVENTOR.
John B. Keir.
BY
Harness, Dickey & Pierce.
ATTORNEYS.

Sept. 30, 1958 J. B. KEIR 2,854,162
LOW BED TRAILER WITH REMOVABLE GOOSENECK
Filed Dec. 7, 1956 3 Sheets-Sheet 2

INVENTOR.
John B. Keir.
BY
Harness, Dickey & Pierce
ATTORNEYS.

Sept. 30, 1958            J. B. KEIR            2,854,162
LOW BED TRAILER WITH REMOVABLE GOOSENECK
Filed Dec. 7, 1956            3 Sheets-Sheet 3
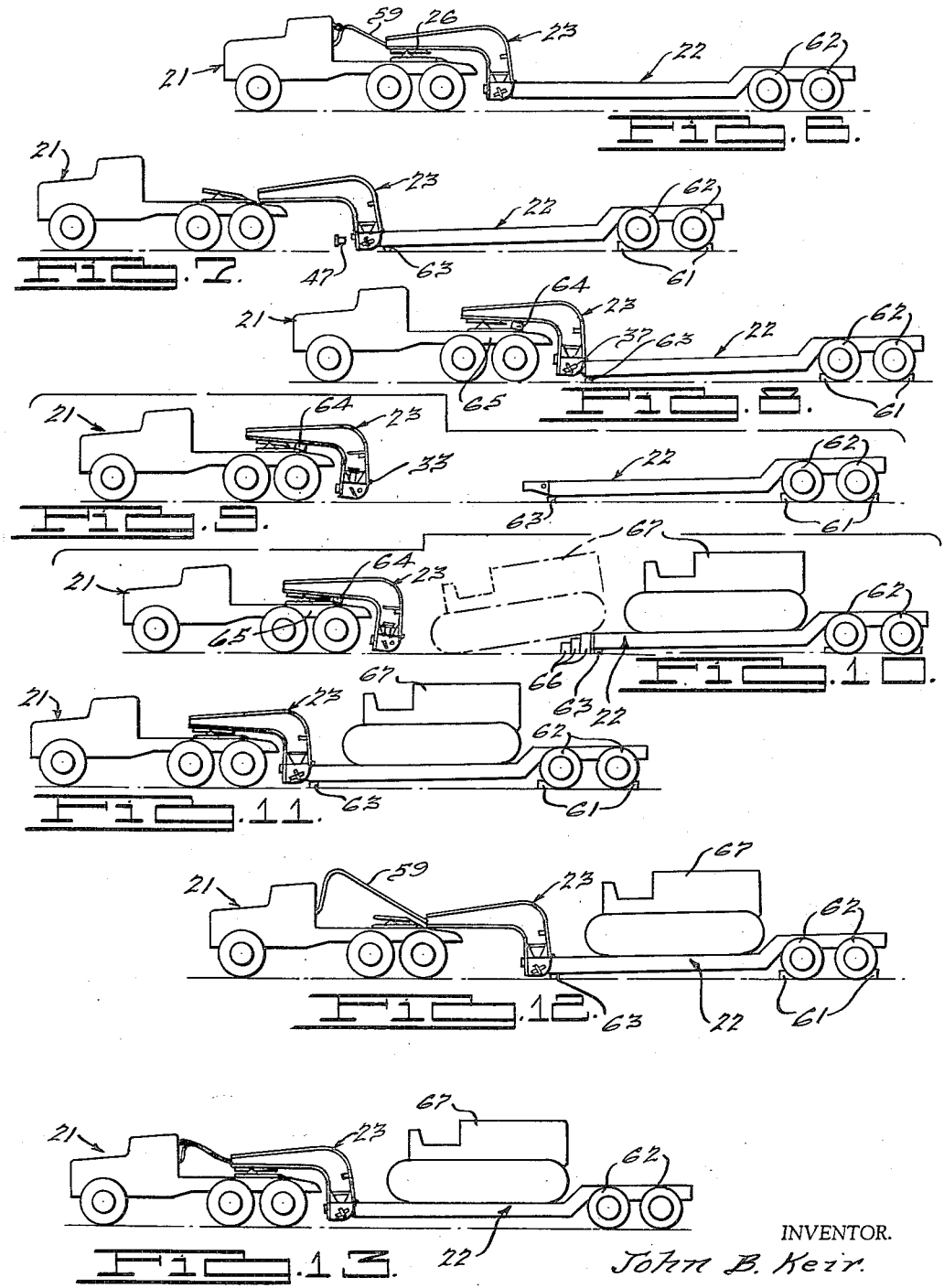
INVENTOR.
John B. Keir.
BY
Harness, Dickey & Pierce
ATTORNEYS.

United States Patent Office 2,854,162
Patented Sept. 30, 1958

2,854,162
LOW BED TRAILER WITH REMOVABLE GOOSENECK

John B. Keir, Detroit, Mich., assignor to Fruehauf Trailer Company, Detroit, Mich., a corporation of Michigan Application December 7, 1956, Serial No. 626,893

12 Claims. (Cl. 214—506)

This invention relates to removable gooseneck semi-trailers, and more particularly to low bed trailers of the type which enable end loading of freight onto the trailer bed.

It is an object of the present invention to provide a novel and improved trailer construction which will enable quick and easy removal of the gooseneck draw bar from the low bed trailer so that front-end loading and unloading of heavy equipment may be efficiently accomplished.

It is another object to provide an improved removable gooseneck trailer construction of this type which requires no special power means or other equipment in order to perform the removal and attaching operations, and in which tractors of conventional construction may be employed in conjunction with the trailer.

It is a further object to provide an improved removable gooseneck construction of the above character in which the removal and attaching operations may be safely carried out with a minimum of personnel, which requires a relatively narrow handling space and may be manipulated on sloping as well as level ground.

Other objects, features and advantages of the present invention will become apparent from the subsequent description, taken in conjunction with the accompanying drawings.

In the drawings:

Figure 1 is a perspective view of a tractor and semi-trailer of the low bed gooseneck type, incorporating the features of this invention with the parts shown in their assembled position.

Figure 2 is a fragmentary elevational view of the connection between one of the gooseneck members and its corresponding trailer connecting tongue, parts being broken away for clarity;

Figure 3 is a fragmentary cross-sectional view in elevation taken along the line 3—3 of Figure 2 and showing the internal construction of one of the filler pieces;

Figure 6 is an elevational view of the tractor and semi-trailer showing the parts in assembled condition;

Figure 7 is a view similar to Figure 6 showing the first step in the sequence of operations which take place when the gooseneck is to be removed from the trailer, the tractor being separated from the gooseneck and the filler pieces removed;

Figure 8 shows the next step in the sequence of operations with the tractor recoupled to the gooseneck;

Figure 9 shows the gooseneck removed from the trailer;

Figure 10 shows the manner in which the freight may be placed on the trailer;

Figure 11 shows the tractor backed up so that the gooseneck may be recoupled to the trailer;

Figure 12 shows the tractor moved away from the gooseneck so that the filler pieces may be inserted; and Figure 13 shows the tractor recoupled with the gooseneck and trailer.

Figure 4:
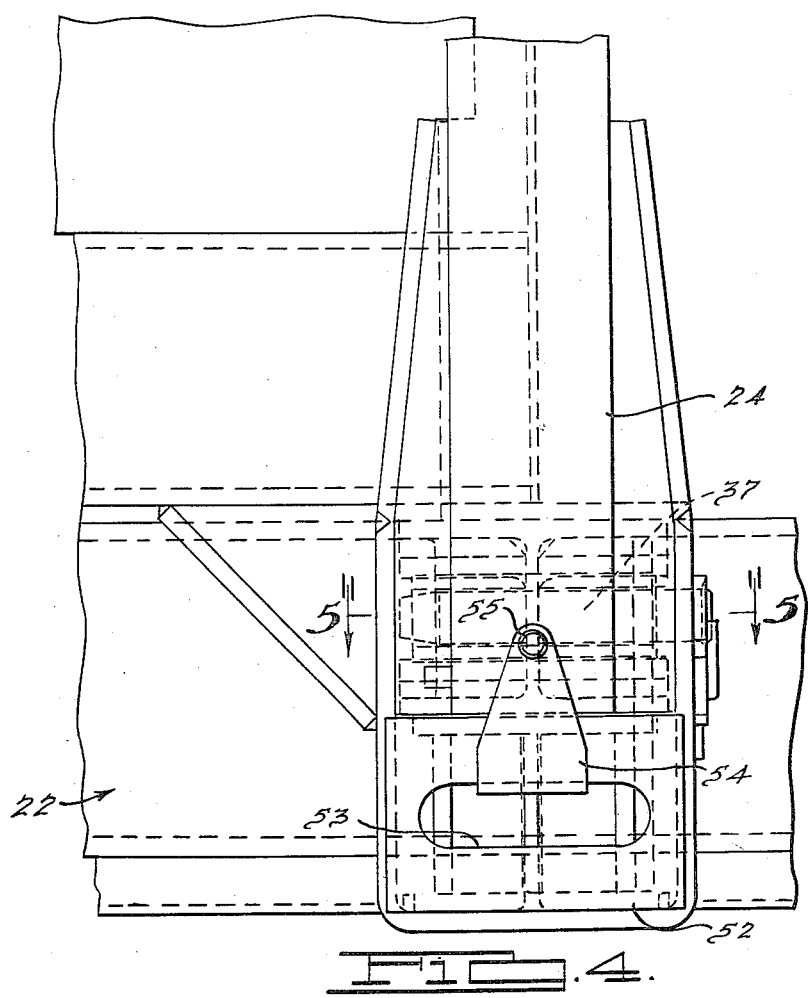
Figure 4 is an end elevational view of the assembly shown in Figure 2, taken in the direction of arrow 4, and showing the relative disposition of a connecting pin and filler piece.

In general terms, the invention comprises a low bed semi-trailer having an L-shaped draw bar, commonly known as a "gooseneck" detachably connected to the forward end thereof by means of coupling pins and filler pieces which are disposed between the lower portions of the gooseneck members and tongues extending from the trailer. The arrangement is such that, in order to remove the gooseneck assembly from the forward end of the trailer, the tractor is first disconnected from the gooseneck and the forward end of the trailer dropped until it rests on a block of wood such as a dunnage piece which holds the lower portion of the gooseneck off the ground. The filler pieces may then be removed and the gooseneck recoupled with the tractor, a second dunnage piece being placed between the underside of the horizontal portion of the gooseneck and the tractor frame to hold the gooseneck off the ground when it is disconnected from the trailer. The coupling pins may then be removed, the tractor pulled forwardly with the gooseneck, and the freight loaded onto the front end of the trailer. To recouple the gooseneck, the tractor is backed up, the coupling pins reinserted, the tractor uncoupled from the gooseneck to permit reinsertion of the filler pieces, and the tractor then recoupled in the usual manner.

Referring more particularly to the drawings, Figure 1 is a general view of the construction, showing a tractor generally indicated at 21 and a low bed semi-trailer generally indicated at 22, the tractor and trailer being coupled by a gooseneck assembly generally indicated at 23. The gooseneck assembly comprises a pair of identical L-shaped members 24 the horizontal portions of which carry between them a conventional assembly 25 for connecting the gooseneck with the tractor fifth wheel 26. As is shown best in Figure 2, the forward end of trailer 22 is provided with a pair of tongues 27, one of which is visible in this figure, and these tongues extend forwardly for providing a detachable connection with the lower ends of gooseneck members 24. Each tongue 27 is of generally rectangular cross-sectional shape, the area of cross section being decreased toward the outer end of the tongue, with a portion 28 of constant cross-sectional area at the forward end, this portion being again tapered as indicated at 29 to facilitate insertion in the gooseneck socket.

Each gooseneck member 24 has a pair of downwardly extending parallel plates 31 at the lower end thereof between which tongue 27 is disposed when the gooseneck and trailer are coupled. A horizontal plate 32 extends between the upper edges of plates 31, the rear end of plate 32 having an upwardly curved edge 33 for purposes later described. A smaller plate 34 extends horizontally between the forward lower edges of plates 31, these latter edges being inclined upwardly and rearwardly to the rear of plate 34. The vertical rear edges 35 of plates 31 are adapted to be engaged by the forward cross member 36 of trailer 22 when tongues 27 are inserted in the sockets formed by plates 31, 32 and 34, thus positioning tongues 27 in such a manner that their forward portions 28 are spaced above plates 34.

Figure 5:
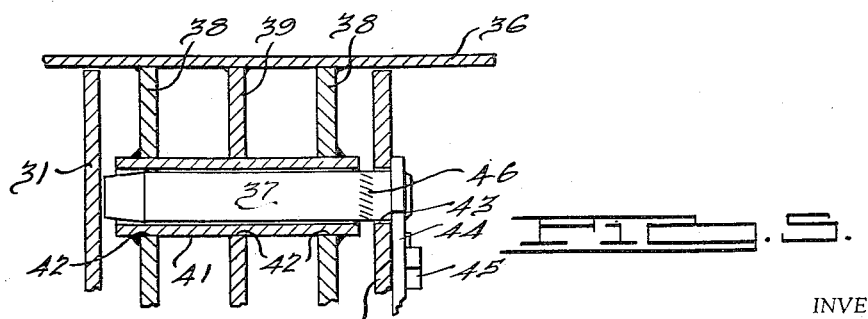
Figure 5 is a fragmentary cross-sectional view taken along tre line 5—5 of Figure 4 and showing the elements within which a connecting pin is disposed.

A removable coupling pin 37 is provided for maintaining the connection between each gooseneck member 24 and the tongue inserted therein. As is best seen in Figures 2 and 5, each tongue 27 comprises a pair of vertical side plates 38 and a vertical central plate 39, a retaining sleeve 41 passing through apertures 42 in these three plates and being secured to the plates by such means as welding. The outer of plates 31 on each gooseneck member 24 (the right hand plate as shown in Figure 5) is provided with an elongated aperture 43 for receiving pin 37, the upper portion of this aperture being aligned with sleeve 41 when the tongue is positioned as shown in Figure 2. A laterally extending handle 44 is provided at the outer end of each pin 37, this handle being disposable within a retaining clip 45 secured to the outside of outer plate 31. In particular, pin 37 may be rotated by means of handle 44 to a position in which the handle is retained within clip 45, as seen in Figure 2, the handle tending to remain in this position because of its weight. In this position, pin 37 is held in place within aperture 43 and sleeve 41. When handle 44 is swung clockwise from its position shown in Figure 2, it will be withdrawn from retention by clip 45, after which pin 37 may be withdrawn. It will be noted that when in their operative positions, pins 37 will be subjected to a horizontal shear stress in the zone indicated by the diagonal lines marked 46 in Figure 5, this action serving to hold the tongues and gooseneck in coupled position.

To transmit the vertical load at the forward end of trailer 22 to gooseneck 23, and to maintain the proper angular relationship between tongues 27 and gooseneck members 24, a pair of filler pieces generally indicated at 47 are provided. The construction of these filler pieces is best seen in Figures 2 and 3. Each filler piece 47 comprises upper and lower plates 48 and 49 respectively, these plates being connected by three vertical plates 51 so as to form a block-shaped member of substantial rigidity and strength to withstand compressive forces. A face plate 52 may be provided at the forward edges of these plates, an elongated aperture 53 being provided in plate 52 for handling purposes. When in its operative position, each filler piece 47 will be disposed between the lower surface of forward tongue portion 28 and the parallel upper surface of gooseneck plate 34. As is seen in Figure 2, positioning of filler piece 47 in this manner will substantially prevent relative pivotal movement between tongue 27 and gooseneck member 24. In particular, counterclockwise movement of tongue 27 about pin 37 will be prevented by the engagement of forward tongue portion 28 with the upper surface of filler piece 47, and clockwise movement will be prevented by the engagement of the upper surface of tongue 27 with plate 32. A retaining plate 54 may be pivotally mounted at 55 on each gooseneck member 24 immediately above its aperture 56 which receives filler piece 47, in order to releasably retain filler piece 47 in position. A storage clip 57 may also be provided on the side of each gooseneck member 24, this clip extending between a pair of gusset plates 58 and being spaced from the main surface of gooseneck member 24 in order to serve as a storage bracket for pin 37 and filler piece 47 when removed from their operative positions.

Operation

The functions of the various elements of the invention may perhaps best be understood by means of a description of events which take place during a normal operation which requires that a large piece of freight be loaded onto the front end of trailer 22. Starting with an initial position as shown in Figure 6, in which tractor 21 is hitched to trailer 22 through gooseneck 23, the position of the connecting elements is as shown in Figures 2-5. In particular, gooseneck 23 is connected to tractor fifth wheel 26, and trailer tongues 27 are coupled with gooseneck members 24 by means of pins 37, with filler pieces 47 in position to prevent relative rotation between trailer 22 and gooseneck 23.

As the first step in the operation, air lines 59 are shut off on the tractor, disconnected from the gooseneck and trailer, and stowed. Blocks 61 are then placed adjacent trailer wheels 62, as shown in Figure 7, to prevent undesired movement of the trailer. One or more blocks 63 are placed under the forward end of trailer 22, these blocks being of sufficient thickness to hold the lower end of gooseneck 23 off the ground. Gooseneck 23 is then disconnected from tractor 21, and the tractor moved forwardly as shown in Figure 7.

With the forward end of gooseneck 23 unsupported, filler pieces 47 will no longer be subject to the compressive forces normally existing between tongue portions 28 and gooseneck plates 34, since gooseneck 23 will have a counterclockwise moment about coupling pins 37. Filler pieces 47 may then be removed as shown in Figure 7. Tractor 21 is then backed up until it is recoupled with gooseneck 23, the parts assuming the position shown in Figure 8. It will be noted that as tractor 21 is recoupled to gooseneck 23, the gooseneck will pivot clockwise about the axis of coupling pins 37, due to the absence of filler pieces 47. This action will be facilitated by elongated apertures 43 and the curved rear edges 33 of gooseneck plates 32, since pins 37 will be able to move to the lower ends of slots 43 and curved edge 33 will permit a smooth rocking action of the gooseneck on tongues 27. Coupling pins 37 are removed from between the trailer and gooseneck, and one or more supporting blocks 64 are then inserted between gooseneck 23 and tractor frame rails 65, as shown in Figure 8. For this purpose, rails 65 are preferably of a type which extend sufficiently rearwardly in a downwardly tapered manner to facilitate insertion of blocks 64.

Tractor 21 may then be pulled forwardly away from trailer 22, carrying gooseneck 23 with it as shown in Figure 9. Because of the presence of blocks 64, the lower end gooseneck 23 will be prevented from dragging on the ground. Shoring blocks 66 or a loading ramp may then be placed adjacent the forward end of trailer 22 and the freight 67 loaded thereon, as shown in Figure 10. If the trailer had already been loaded, unloading may take place at this point in the operation. Shoring 66 is then removed and tractor 21 backed up with the gooseneck to the rear frame, the gooseneck being guided so that tongues 27 will enter the sockets in gooseneck members 24. During this movement, curved rear edges 33 of plates 32 permit the gooseneck to slide up the slightly inclined upper surfaces of tongues 27, thus relieving the pressure of the weight of gooseneck 23 on blocks 64. Coupling pins 37 are then inserted in apertures 43 and sleeves 41, as shown in Figure 11, and supporting blocks 64 removed from between gooseneck 23 and frame 65 of tractor 21. The tractor is then uncoupled from gooseneck 23 and moved forwardly, as shown in Figure 12, permitting the forward end of the gooseneck to drop so that space is created for insertion of filler pieces 47. With the filler pieces inserted, the air lines 59 of the tractor may be reconnected to the trailer and the trailer brakes set. Tractor 21 is then backed up and coupled to gooseneck 23, as shown in Figure 14, lifting the forward end of trailer 22 from blocks 63, and blocks 61 and 63 are stowed. The cycle has now been completed and the tractor, trailer and gooseneck are in their transport position.

It should be noted that during the entire cycle of operations described above, no winch or other power unit, other than the tractor itself, is required, and the only extra equipment needed are several blocks or dunnage pieces of the type which are ordinarily available in the field. A minimum of manipulation or handling is required on the part of the operators, removal and insertion of pins 37 and filler pieces 47 being facilitated by the fact that no forces are being exerted on these parts while they are handled. Because of the relatively simple movements required of tractor 21, the gooseneck and trailer may be easily recoupled, even in narrow areas or on slopes.

While it will be apparent that the preferred embodiment of the invention disclosed is well calculated to fulfill the objects above stated, it will be appreciated that the

What is claimed is:

1. In combination, a trailer, a tongue projecting from the forward end of said trailer, a gooseneck having means at its forward end for detachable connection to the fifth wheel of a tractor, a socket at the lower end of said gooseneck for receiving said tongue, a coupling pin, apertured portions in said socket and said tongue for receiving said coupling pin, vertically spaced surfaces at the forward end of said tongue and the lower end of said gooseneck, and a filler piece adapted to be removably inserted between said spaced surfaces, thereby preventing relative rotation between said gooseneck and tongue.

2. In combination, a trailer, a tongue projecting from the forward end of said trailer, a goosneck, means at the forward end of said gooseneck for detachably connecting the gooseneck to the fifth wheel of a tractor, a socket at the lower end of said gooseneck for receiving said tongue, said socket having an upper plate engageable with the upper surface of said tongue, a coupling pin, apertured portions in said socket and tongue for the reception of said pin, a lower plate in said socket spaced below the lower surface of said tongue forwardly of said coupling pin, and a filler piece insertable between said lower plate and said tongue to substantially prevent relative rotation between said gooseneck and tongue.

3. In combination, a trailer, a tongue projecting forwardly from said trailer, said tongue having a relatively flat upper surface and a lower surface the rear portion of which slopes forwardly and upwardly and the forward portion of which is parallel with said upper surface, a gooseneck, means at the forward end of said gooseneck for detachably connecting the gooseneck to the fifth wheel of a tractor, a socket at the lower end of said gooseneck for the reception of said tongue, said socket having an upper plate engageable with the upper surface of said tongue, a coupling pin, apertured portions in said socket and tongue for receiving said pin, a lower plate in said socket forwardly of said pin and spaced downwardly from the forward portion of said tongue, and a filler piece insertable between said lower plate and said tongue to support said tongue and substantially prevent relative pivotal movement of said tongue and gooseneck about the axis of said coupling pin.

4. In combination, a trailer, a tongue projecting from the forward end of said trailer, a gooseneck, means at the forward end of said gooseneck for detachably connecting the gooseneck to the fifth wheel of a tractor, a socket at the lower end of said gooseneck for receiving said tongue, said socket having an upper plate engageable with the upper surface of said tongue, a coupling pin, apertured portions in said socket and tongue for the reception of said pin, the apertured portion in said socket being elongated to permit limited rocking movement of said gooseneck with respect to said tongue, a lower plate in said socket spaced below the lower surface of said tongue forwardly of said coupling pin, and a filler piece insertable between said lower plate and said tongue to support said tongue and substantially prevent relative rotation between said gooseneck and tongue.

5. In combination, a trailer having a pair of tongues projecting forwardly therefrom, a gooseneck comprising a pair of L-shaped gooseneck members, means disposed above the forward ends of said members for detachably connecting the gooseneck to the fifth wheel of a tractor, sockets at the lower ends of said gooseneck members for the insertion of said tongues, a pair of coupling pins, apertured portions in said sockets and tongues for the reception of said pins, the apertured portions in said tongues being elongated to permit limited rocking movement of said gooseneck with respect to said tongues, vertically spaced parallel surfaces between the lower ends of said gooseneck members and their respective tongues forwardly of said coupling pins, and a pair of filler pieces insertable in the spaces between said surfaces whereby said tongues will be supported and relative rocking movement between said gooseneck and tongues will be substantially prevented.

6. The combination according to claim 5, said sockets each having an upper plate engageable with the upper surface of its corresponding tongue, said upper plates each having an upwardly and rearwardly curved rear edges.

7. The combination according to claim 5, the apertured portions in said tongues being provided with sleeves for the reception of said pins, a transversely extending handle on each pin, and a clip on the side of each socket for removably retaining its corresponding handle.

8. The combination according to claim 5, further provided with a swingable retaining member on each gooseneck member for releasably retaining its corresponding filler piece.

9. The combination according to claim 5, each of said tongues having a flat upper surface, a lower surface the rear portion of which slopes upwardly and forwardly and the forward portion of which is parallel with said upper surface, and a tapered forward end to facilitate insertion in its corresponding socket.

10. The combination according to claim 5, each of said filler pieces comprising upper and lower plates and a plurality of vertical plates extending therebetween to form a block-like structure of substantially rectangular cross-sectional shape.

11. In combination, a tongue adapted to be mounted on and to project from the forward end of a trailer, a gooseneck having means at its forward end for detachable connection to the fifth wheel of a tractor, a socket at the lower end of said gooseneck for receiving said tongue, a coupling pin, apertured portions in said socket and said tongue for receiving said coupling pin, vertically spaced surfaces at the forward end of said tongue and the lower end of said gooseneck and a filler piece adapted to be removably inserted between said spaced surfaces, thereby preventing relative rotation between said gooseneck and tongue.

12. In combination, a pair of tongues adapted to be mounted on and to project from the forward end of a trailer in side by side but mutually spaced relation, a gooseneck comprising a pair of L-shaped gooseneck members, means disposed above the forward ends of said members for detachably connecting the gooseneck to the fifth wheel of a tractor, sockets at the lower ends of said gooseneck members for the insertion of said tongues, a pair of coupling pins, apertured portions in said sockets and tongues for the reception of said pins, the apertured portions in said tongues being elongated to permit limited rocking movement of said gooseneck with respect to said tongues, vertically spaced parallel surfaces between the lower ends of said gooseneck members and their respective tongues forwardly of said coupling pins, and a pair of filler pieces insertable in the spaces between said surfaces whereby said tongues will be supported and relative rocking movement between said gooseneck and tongues will be substantially prevented.

References Cited in the file of this patent

UNITED STATES PATENTS

| | | |
|---|---|---|
| 2,590,210 | Rogers | Mar. 25, 1952 |
| 2,663,574 | Martin | Dec. 22, 1953 |